(12) United States Patent
Miller et al.

(10) Patent No.: US 10,581,257 B2
(45) Date of Patent: *Mar. 3, 2020

(54) LIGHTWEIGHT, WALLET-SIZED PORTABLE POWER CHARGER KIT WITH REMOVABLE CHARGING CABLE

(71) Applicant: Halo International Sezc Ltd., Georgetown, Grand Cayman (KY)

(72) Inventors: Garold C. Miller, Glastonbury, CT (US); Nathan Daniel Weinstein, Glastonbury, CT (US)

(73) Assignee: Halo International Sezc Ltd., Georgetown (KY)

( * ) Notice: Subject to any disclaimer, the term of this patent is extended or adjusted under 35 U.S.C. 154(b) by 218 days.

This patent is subject to a terminal disclaimer.

(21) Appl. No.: 15/414,908

(22) Filed: Jan. 25, 2017

(65) Prior Publication Data

US 2017/0133870 A1    May 11, 2017

Related U.S. Application Data

(63) Continuation of application No. 14/643,588, filed on Mar. 10, 2015, now Pat. No. 9,595,840.

(60) Provisional application No. 61/950,578, filed on Mar. 10, 2014.

(51) Int. Cl.
    *H02J 7/00*    (2006.01)
(52) U.S. Cl.
    CPC .......... *H02J 7/0044* (2013.01); *H02J 7/0042* (2013.01); *H02J 7/0052* (2013.01); *H02J 2007/0062* (2013.01)
(58) Field of Classification Search
    CPC .............................. H02J 7/0042; H02J 7/0044

USPC .................................. 320/103, 107, 112–115
See application file for complete search history.

(56) References Cited

U.S. PATENT DOCUMENTS

| | | |
|---|---|---|
| D592,138 S | 5/2009 | Mahaffey et al. |
| D618,237 S | 6/2010 | Wang |
| D628,153 S | 11/2010 | Fujii et al. |
| D628,535 S | 12/2010 | Cheng |
| D641,754 S | 7/2011 | Camarena et al. |
| D643,427 S | 8/2011 | McGoldrick et al. |

(Continued)

OTHER PUBLICATIONS

"Power Wallet Shop Support", www.power-wallet.net, Yeiser Research & Development, LLC, 2013.

*Primary Examiner* — Richard V Muralidar
(74) *Attorney, Agent, or Firm* — Lathrop GPM LLP

(57) ABSTRACT

A portable power charger kit is provided for charging electronic devices from a rechargeable internal battery. The portable charger kit comprises a wallet, a charger unit, and one or more interchangeable charging cables, each having a first end connection interface and a second end connection interface. The ends of the charging cable are storable within respective first and second cavities formed in the charger unit. A power connection port is provided in the charger unit in operative communication with the internal battery. The connection port may be disposed within the first cavity for engagement with the first connection interface of the charging cable. The second end of the charging cable may be removed from its storage cavity and flexed out and away from the charger housing for engagement with a portable electronic device or an external power source while the first end remains in engagement with the power connection port.

19 Claims, 6 Drawing Sheets

(56) References Cited

U.S. PATENT DOCUMENTS

| | | |
|---|---|---|
| D656,096 S | 3/2012 | Sasada et al. |
| D659,094 S | 5/2012 | Brand et al. |
| D663,684 S | 7/2012 | Yang |
| D663,685 S | 7/2012 | Yang |
| D680,063 S | 4/2013 | Sasada |
| D682,196 S | 5/2013 | Leung |
| D682,197 S | 5/2013 | Leung |
| D697,867 S | 1/2014 | Weinstein et al. |
| D713,785 S * | 9/2014 | Tehrani .................. D13/103 |
| D715,219 S | 10/2014 | Cepress et al. |
| D722,961 S | 2/2015 | Lin et al. |
| D727,257 S | 4/2015 | Miller et al. |
| D727,258 S | 4/2015 | Miller et al. |
| 9,385,549 B2 * | 7/2016 | Miller .................. H02J 7/0042 |
| 9,595,840 B2 * | 3/2017 | Miller .................. H02J 7/0042 |
| 9,923,392 B2 * | 3/2018 | Weinstein ............. H02J 7/0044 |
| 2008/0174265 A1 | 7/2008 | Toya |
| 2009/0267562 A1 | 10/2009 | Guccione et al. |
| 2013/0150134 A1 | 6/2013 | Pliner et al. |
| 2014/0035511 A1 | 2/2014 | Ferber |
| 2014/0042969 A1 | 3/2014 | Miller et al. |
| 2014/0094054 A1 * | 4/2014 | Dentzel .................. H01R 13/72 439/501 |
| 2014/0195826 A1 | 7/2014 | Wojcik |
| 2015/0028797 A1 | 1/2015 | Miller et al. |
| 2015/0094123 A1 | 4/2015 | Yeiser, IV |

* cited by examiner

LIGHTWEIGHT, WALLET-SIZED PORTABLE POWER CHARGER KIT WITH REMOVABLE CHARGING CABLE

CROSS-REFERENCE TO RELATED APPLICATION

This application is a continuation of U.S. patent application Ser. No. 14/643,588, filed Mar. 10, 2015, which claims priority to U.S. Provisional Application No. 61/950,578, filed Mar. 10, 2014, each of which is incorporated by reference in its entirety.

FIELD OF INVENTION

The present invention generally relates to a power charging devices, and more particularly relates to a lightweight, wallet-sized portable power charger for charging electronic devices when a standard external power source is not convenient.

BACKGROUND OF THE INVENTION

Present day consumers typically own several electronic devices specifically designed for portability and use on-the-go, including, for example, a mobile phone or smart phone, a portable music player like an iPod® or an MP3 player, a tablet, a portable gaming unit, a digital camera or camcorder, and the like. Each of these devices requires frequent recharging. Such electronic devices typically utilize a cable for connecting the device to a power source, such as a wall outlet, a car charger, an airplane charger, or a computer. However, a separate cable is usually required for each power source. Moreover, even when the device is connected to an external power source for recharging, it is difficult to continue using the device, as the device needs to remain tethered to the power source during charging.

Similarly, a separate charging cable is usually required for connecting an electronic device with a particular power source. For example, a consumer will have one cable for charging a phone at home with an AC wall socket, and another cable for charging the phone in the car using the DC car charging socket, and perhaps additional cables for charging the phone using a computer or on an airplane. Moreover, different electronic devices often utilize different connection ports and interfaces such that a single charging cable is not compatible with multiple devices. Accordingly, a tech-savvy consumer, with several electronic devices, will usually have multiple charging cables to keep track of, and find a place to store each applicable charging cable when on the move. Even then, the consumer may be without sufficient power to recharge a phone due to bad weather or a power outage, or may not always be in a place where a power source is readily available, or even if so, may not have the appropriate cable or adapter available to use with a particular power source. Furthermore, the consumer may not always be in a place where a power source is readily available, for example, if they are at the park, or may not have the appropriate cable or adapter available to use with a particular power source, for example, they are in the office but left their charging cable at home, or may be without sufficient power to recharge a phone or other device due to bad weather or a power outage.

On occasion, an electronic device needs a small amount of charge to finish a task before the device powers down due to insufficient battery capacity. For example, a user on a call using a mobile phone may wish to finish the call, but cannot find a power source to plug into, may not have enough time to get to a power source, or may not have the appropriate charging cable with her at the time. As noted, if the phone is plugged into a traditional power source, like a wall socket, it is difficult to continue using the phone as desired. Accordingly, what is needed is a power charger, even with a small boost of power, that is as portable as the electronic device and preferably easy to carry with the electronic device and the appropriate charging cable, and thus easily usable on-the-go.

Further, portable power chargers designed for use on-the-go must be suitable to a variety of conditions, as they are often most in need where a standard external power source is not available, and thus often needed when there is no power at all. For example, a portable power charger is especially useful when walking, camping, at the park, at the mall, or at a sporting event, where one may need to use a phone in an emergency situation. In such situations, the user doesn't want to have to carry too many objects, and this may not be able to carry a large power charger, even if portable, and one or more charging cables in addition to an electronic device (e.g., smart phone). Accordingly, a portable power charger that is easy to carry around without taking up too much space is desirable.

In view of the foregoing, there is a need for a charger that can be used to charge a variety of electronic devices, including but not limited to smart phones, mobile phones, data tablets, music players, digital cameras, camcorders, gaming units, e-books, Bluetooth headsets and earpieces, GPS devices, and the like, either individually or simultaneously in various combinations. Additionally, there is a need for such a charger that is portable, has a compact size, and is easy to use in various conditions and locations to charge one or more electronic devices simultaneously, including but not limited to in a house or office, a car or an airplane, as well as on-the-go, without compromising operation and performance. Further, there is a need for a combined charger and charging cable that is compact, lightweight and easy to transport without compromising its functionality for a user requiring a portable source of power. Still further, there is a need for a portable charger that can be easily recharged from an external power source, providing increase flexibility and convenience of use for the portable charger. Still further, there is a need for a portable charger that can recharge its internal battery from an external power source at the same time as an electronic device connected to the charger is being recharged by or via the charger unit. Accordingly, it is a general object of the present invention to provide a portable charger that improves upon conventional power chargers currently on the market and that overcomes the problems and drawbacks associated with such prior art chargers.

SUMMARY OF THE INVENTION

In accordance with the present invention, a portable power charger kit comprises a wallet and a lightweight, wallet-sized portable charger provided for use therein for charging one or more electronic devices. In general, a portable charger includes an internal rechargeable battery unit for connecting to and recharging one or more electronic device, as necessary, at least one power connection port for connecting the charger unit with at least one electronic device, or an external power source, or both, and a removable charging cable for connecting the power charger with electronic devices and external power sources.

In a first aspect of the present invention, the charger unit comprises a charger housing sized to fit into a wallet, and a rechargeable battery unit disposed therein and operatively connected to a first power connection port that operates as a power output for charging the internal battery of an electronic device connected to the charger unit via the first power connection port from the rechargeable battery unit, and a second power connection port that operates as a power input for providing an electrical charge from an external power source for recharging the internal battery unit when the charger unit is connected to the external power source.

In accordance with the present invention, a portable charging kit can comprise a combination wallet and lightweight, portable power charger with a thin profile such that the charger can fit into the wallet, which can be inserted into a user's pocket without taking up too much space. As so designed, the user is effectively combining two essential objects—namely, a wallet for carrying cash, credit cards, photos and the like and a portable power charger—into one item that reduces carrying space while increasing functionality.

In a preferred design of the portable power charger, at least one removable and replaceable charging cable is provided for storage within the general volume of the charger housing. The charging cable includes a first end with a first head and a first connection interface projecting therefrom, a second end with a second head and a second connection interface projecting therefrom, and an intermediate flexible cable portion connecting the two ends. The charger housing includes a first cavity adapted to receive the first end of the charging cable, and a second cavity adapted to receive the second end of the charging cable such that the first and second connection interface are disposed within the charger housing.

In embodiments of the present invention, the first end of the charging cable can be adapted to connect to the power connection port of the power charger and a second end adapted to connect to an electronic device for recharging from the internal battery of the power charger. When not in use, the charging cable is stored within the charger housing and maintained within a desired footprint of the charger housing. In use—that is, to recharge an electronic device—the second end can be flexed away from the charger housing for connection to an electronic device.

In preferred embodiments, the charging cable can be removed from the charger housing and replaced by another charging cable, as desired—for example, to change out the connection interface on the second end of the cable between a USB, micro-USB, mini-USB, 30-pin, Apple Lightning interface, or other type of connection interface, which provides increased flexibility in use. In alternate embodiments, the charging cable can be attached to the charger housing at the first end with the second end being stored in a storage cavity when not in use, but flexed away from the charger housing for use. Additional cables can also be provided—for example, for storage on the opposite side of the charger housing. Still further, additional power connection ports can be provided on the charger housing which can be used as a power connection input for recharging the internal battery unit of the charger, as a power connection output, for connection to additional electronic devices, as needed, or both.

In a second aspect of the present invention, a portable power charger kit comprises a portable power charger unit sized to fit into a wallet, and multiple interchangeable charging cables. The charging cables are each designed to fit into the same storage space within the general volume of the power charger housing when interchanged. One of said cables is stored in the charger housing at a time, but may be removed and replaced by a different one of said cables. Each cable includes a first end with a first head and a first connection interface projecting therefrom, a second end with a second head and a second connection interface projecting therefrom, and an intermediate flexible cable portion connecting the two ends. The charger housing includes a first cavity adapted to receive the first end of each charging cable and a second cavity adapted to receive the second end of each charging cable such that at least the first and second connection interfaces for each charging cable can be disposed within the general volume of the charger housing when one of said cables is stored in the charger housing.

In preferred embodiments of the present invention, the removable charging cable has a power input end and a power output end. The power input end is adapted to engage a power input connection port so that a power charge can be supplied to the internal battery unit of the power charger when the power output end is connected to an external power source, either directly or via an adapter unit. The power output end is adapted to engage a power output connection port so that a power charge can be supplied from the internal battery to a portable electronic device in need of a charge connected to the power input end. In an embodiment of the present invention, a power output connection port is provided in the charger housing for engagement with the power output end and a power input connection port is provided for engagement with the power input end. In an alternative embodiment, a single power connection port is provided that can act as both a power input and a power output.

In an embodiment of the present invention, the power output connection port is provided within a cavity adapted to receive and store the power output end of the charging cable. That is, when the cable is stored within the charger housing, the power output end of the charging cable is connected with the power output connection port. The other end of the charging cable is stored within its own storage cavity in a non-use condition. When desirable to use the power charger to charge an electronic device, the power input end of the cable can be removed from its storage cavity for engagement with the electronic device. The power output end of the cable remains connected to the power output connection port. A power input connection port could also be provided in the charger housing and the charging cable removed from its storage cavities for engagement with the power input port to recharge the internal battery unit of the charger. In alternate embodiments, where the power connection port is a two-way charging port that can act as both a power input and a power output, the power output end of the cable can likewise remains in place connected to the port for recharging the internal battery of the power charger. In such a design, the charging cable could be removed and replaced with a different charging cable adapted to fit into the storage cavities to change the connection interface on the opposing end of the cable to one that is suitable for a power input connection or a power output connection as needed.

In another embodiment of the present invention, the power output connection port is provided within a cavity adapted to receive and store the power output end of the charging cable while the power input connection port is provided within another cavity to receive and store the power input end of the charging cable. That is, when the cable is stored within the charger housing, the power output end of the charging cable is connected with the power output connection port and the power input end is connected with the power input port. When desirable to use the power charger to charge an electronic device, the power input end of the cable can be removed from its storage cavity for engagement with the electronic device. The power output end of the cable remains connected to the power output connection port. When desirable to recharge the power charger, the power output end of the cable can be removed from its storage cavity for engagement with an external power source. The power input end of the cable remains connected to the power input connection port. In an alternate design of the power charger, the power input connection port can be designed, and perhaps adjustable, to receive and engage different connection interfaces so that removable and interchangeable charging cables can be used without affecting intended operation of the power charger.

In preferred embodiments of the present invention, the wallet of the charger kit includes pockets for holding credit cards, cash, photos and the like. More preferably, the wallet includes a RFID protection barrier to block identity theft by securing information in credit cards stored within the wallet. The power charge unit can also be manufactured from a shiny metallic or faux-metallic material so as to act as a mirror within the wallet.

These and other objects, features and advantages of the present invention will become apparent in light of the detailed description of embodiments thereof, as illustrated in the accompanying drawings.

DETAILED DESCRIPTION OF THE DRAWINGS

Figure 1:
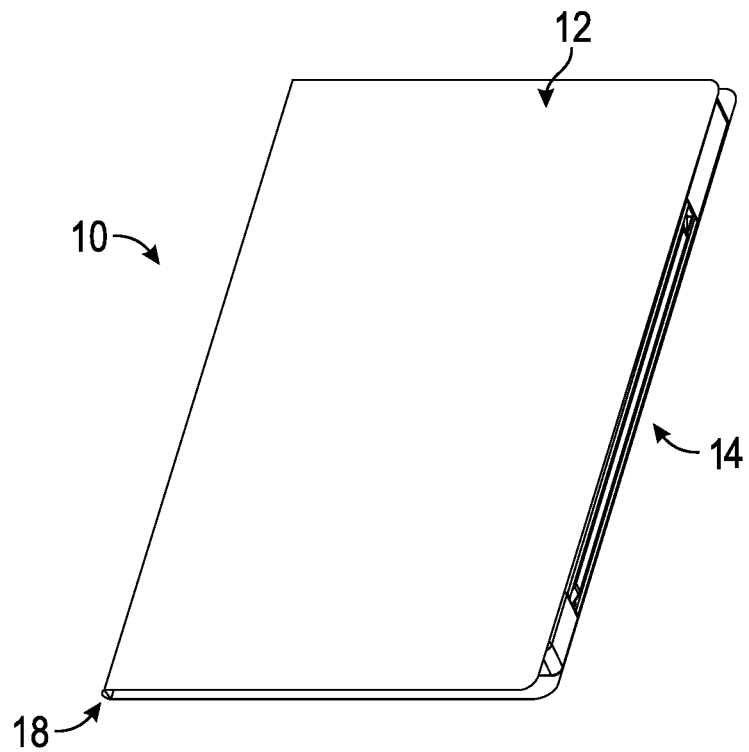
FIG. 1 shows a perspective view of an embodiment of a portable power charger kit in accordance with the present invention, comprising a wallet and a portable power charger stored therein.
Figure 2:
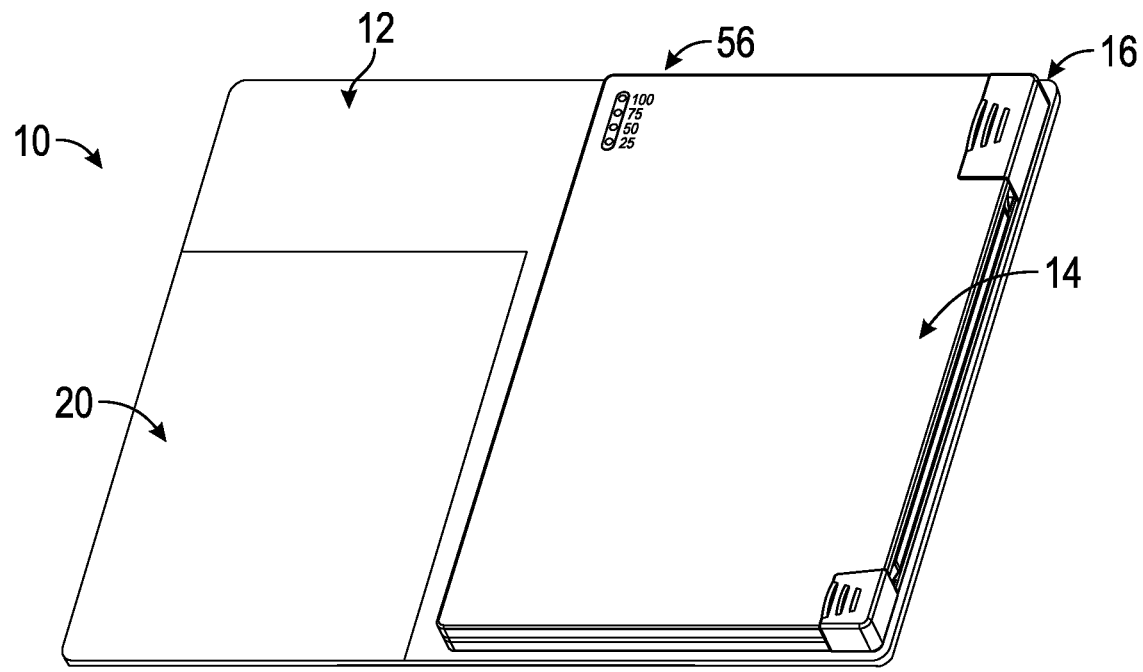
FIG. 2 shows a perspective view of the portable power charger kit of FIG. 1 with the wallet opened to show the portable power charger contained therein.

A portable power charger kit 10 in accordance with embodiments of the present invention is shown in FIGS. 1-2. As illustrated, the power charger kit 10 comprises a wallet 12 and a lightweight, wallet-sized portable power charger 14 for use therein. The power charger kit 10 is designed for portability and convenient on-the-go use to recharge one or more mobile electronic devices. As illustrated, the lightweight, wallet-sized power charger 14 is designed to fit within and be used with the wallet 12, and preferably have a thin profile so it can be easily carried in a pocket without taking up too much space yet without compromising functionality when needed—that is, to recharge a portable electronic device, such as a mobile phone or smart phone, a portable music player like an iPod® or an MP3 player, a tablet, a portable gaming unit, a digital camera or camcorder, and the like. Indeed, in accordance with preferred embodiments of the present invention, the power charger 14 can be used to charge portable electronic devices via a flexible charging cable 16 (shown in more detail in FIG. 5) without needing to open the wallet 12. The connection can be made for recharging the electronic device and both items—i.e., the wallet/charger 10 and the electronic device—can be placed collectively in a pocket, purse or bag during such recharging while the user goes about his/her business.

Referring to FIG. 2, the wallet 12 is designed with a low profile and footprint. The wallet 12 is generally a billfold style with a single fold 18. Inside, the wallet 12 is provided with one or more pockets adapted to receive and hold cash, credit cards, photos and the like. As illustrated in FIG. 2, a pocket 20 is provided on the left-hand side of the wallet 12. The power charger unit 14 is adapted to be secured to the right-hand side of the wallet 12. In preferred embodiments, the power charger unit 14 can be removed from the wallet 12 if desired. The wallet 12 preferably includes a RFID protection layer over the entire wallet 12 to block identity theft—that is, prevent someone from electronically stealing information from credit cards or even the power charger unit 14.

Figure 3:
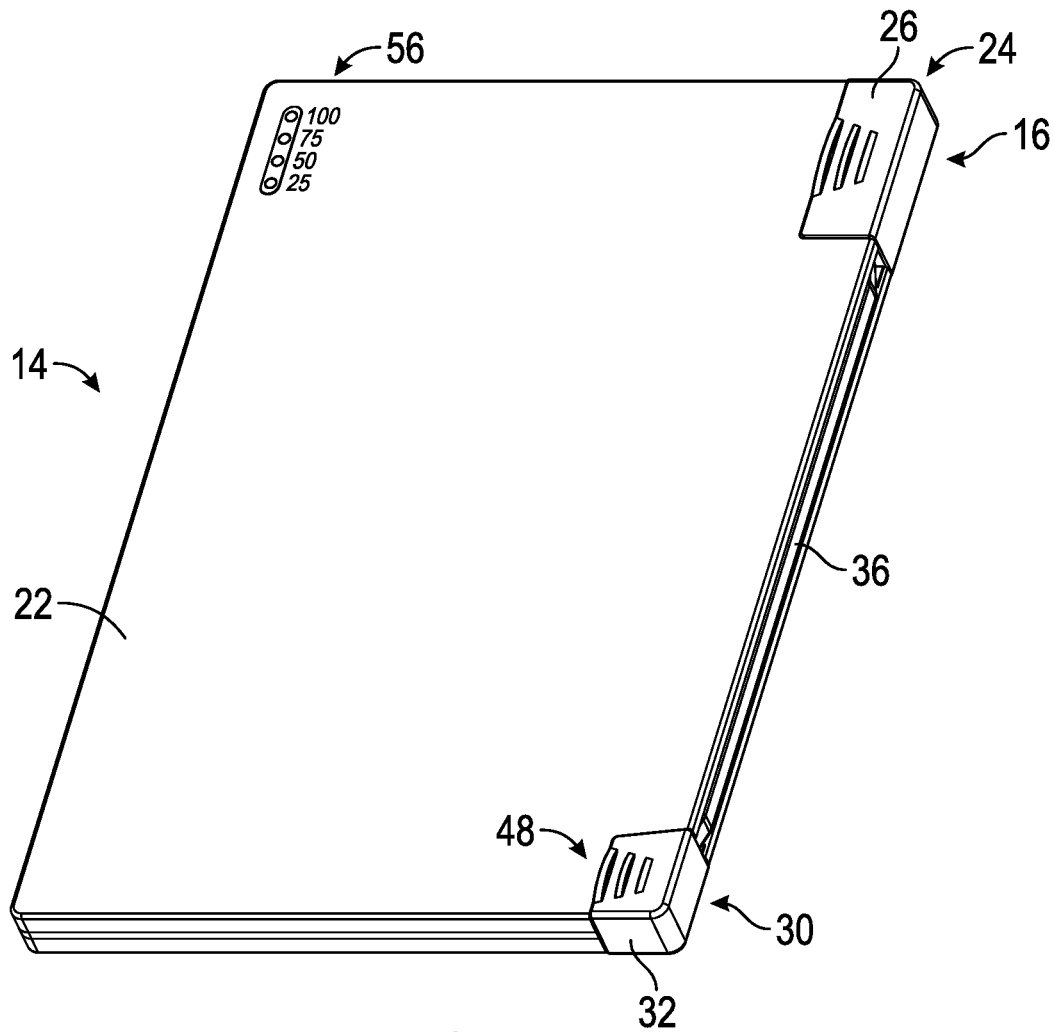
FIG. 3 illustrates a front-top perspective view of a first embodiment a portable power charger for use in the kit of FIG. 2.

Referring to FIG. 3, the power charger 14 generally comprises a wallet-sized charger housing 22 having an internal rechargeable internal battery (not shown) for recharging one or more electronic devices via at least one power connection port provided in the charger housing 22. As shown in FIGS. 2, the charger unit 14 is removably secured in the wallet 12. As shown in FIG. 1, the wallet 12 is designed to fold around the charger unit 14 to completely cover it. This protects the charger unit 14 without inhibiting use of the charger unit 14 to connect to and recharge portable electronic devices. Indeed, the charger unit 14 includes a charging cable 16 connected thereto which can be flexed out of the wallet footprint for connection with an electronic device in need of a recharge, even when the wallet 12 is closed. The wallet 12 can also be opened for use—e.g., to remove cash or a credit card from the internal pocket 20. Opening the wallet 12 also permits the user to see the charger unit 14 and perhaps assess the capacity level of the charger unit via the power indicator means 56, which will be described in more detail below. In an embodiment of the present invention, the charger housing 22 can be made of a shiny metallic or faux-metallic material so that the charger 14 acts as a mirror for use by the user.

Figure 4:
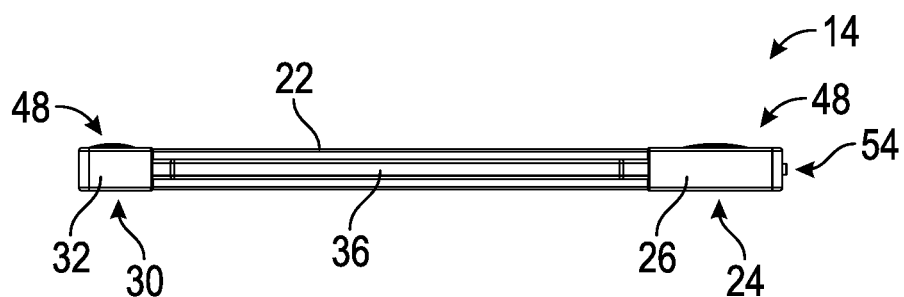
FIG. 4 illustrates a planar right-side view of the portable power charger of FIG. 3.
Figure 5:
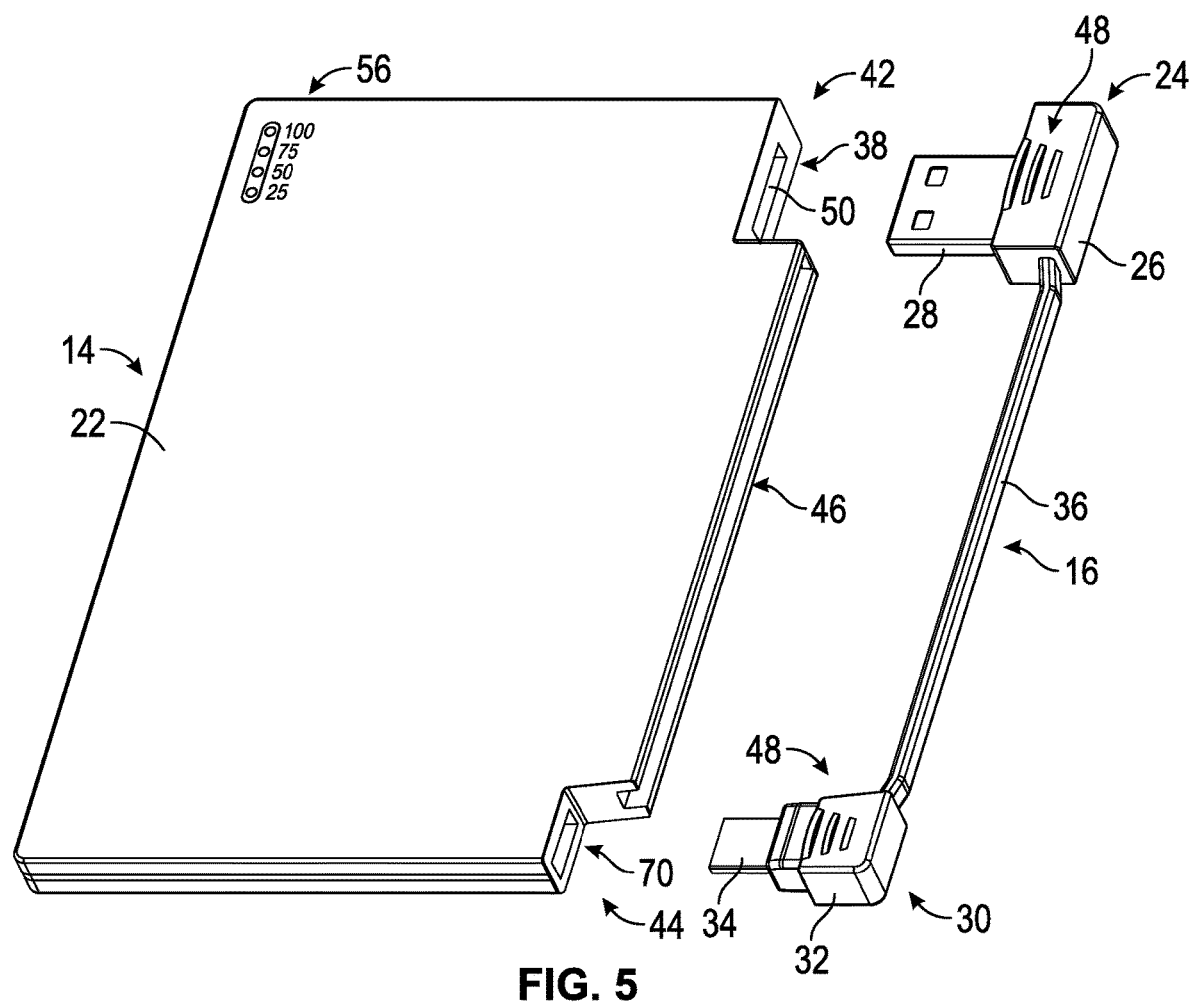
FIG. 5 shows a front-top perspective view of the portable power charger of FIG. 3, having a removable and replaceable charging cable that can be stored within the footprint of the charger housing, but shown in a removed state.

As shown in FIGS. 3-5, the charger kit 10 includes a removable charging cable 16 that is preferably stored within the footprint of the charger 14 and charger housing 22 to provide the charger 14 with a slim and sleek appearance even when the charging cable 16 is stored with the charger housing 22. The charging cable 16 has a first end 24 with a first head 26 and first connection interface 28 projecting therefrom, a second end 30 with a second head 32 and second connection interface 34 projecting therefrom, and an intermediate flexible cable portion 36 connecting the two ends 24, 30. Referring to FIG. 3, the charger housing 22 includes a first cavity 38 adapted to receive the first end 24 of the charging cable 16 and a second cavity 40 adapted to receive the second end 30 of the charging cable 16. More particularly, the cavities 38, 40 are designed to receive at least the first and second connection interfaces 28, 34 for storage, and in at least some embodiments, for operative connection to the charger unit 14, which will be described in more detail below. In the illustrated embodiment, the charger housing 22 is notched to accommodate the first and second ends 24, 30 of the charging cable 16, which effectively fill in the footprint of the charger housing 22, and the cavities 38, 40 extend into the charger housing 22 at said notches 42, 44. The notches 42, 44 are illustrated in FIG. 5. The cavities 38, 40 can be seen in more detail in FIGS. 7-8.

Figure 7:
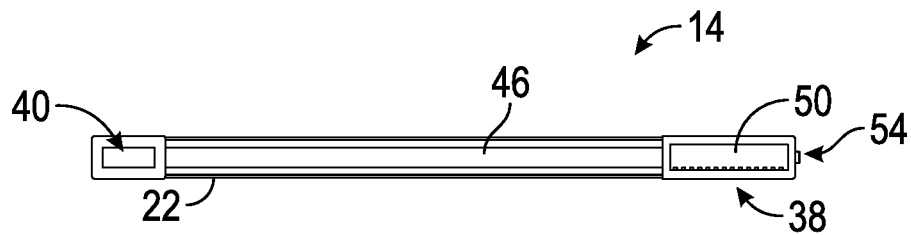
FIG. 7 shows a planar right-side view of the portable power charger of FIG. 3 with the charging cable removed.
Figure 8:
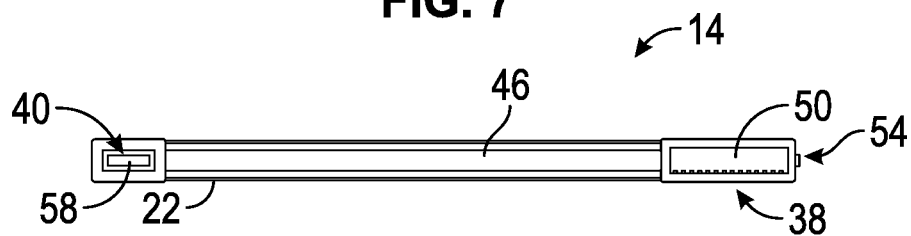
FIG. 8 illustrates a planar right-side view of a second embodiment of a portable power charger for use in the kit of FIG. 2 with the charging cable removed.

As further illustrated in FIGS. 3 and 7-8, a channel cavity 46 is provided in the charger housing 22 for receiving the intermediate cable portion 36 for storage of the charging cable 16 in a non-use condition. It is desirable for the charger unit 14 to maintain a slim and sleek appearance, so the notches 42, 44 and cavities 38, 40 formed in the charger housing 22 are designed to receive the charging cable 16 within the general footprint of the charger housing 22. Each of the first and second heads 26, 32 of the charging cable 16 includes friction grips 48 to facilitate removal of the heads 26, 32 from its respective storage cavity 38, 40 so that the respective connection interface 28, 34 can be exposed for use or the entire charging cable 16 can be removed from the charger housing 22. Indeed, as noted below, the present invention utilizes removable and interchangeable charging cables to increase the functionality of the portable charger kit 10.

Figure 12:
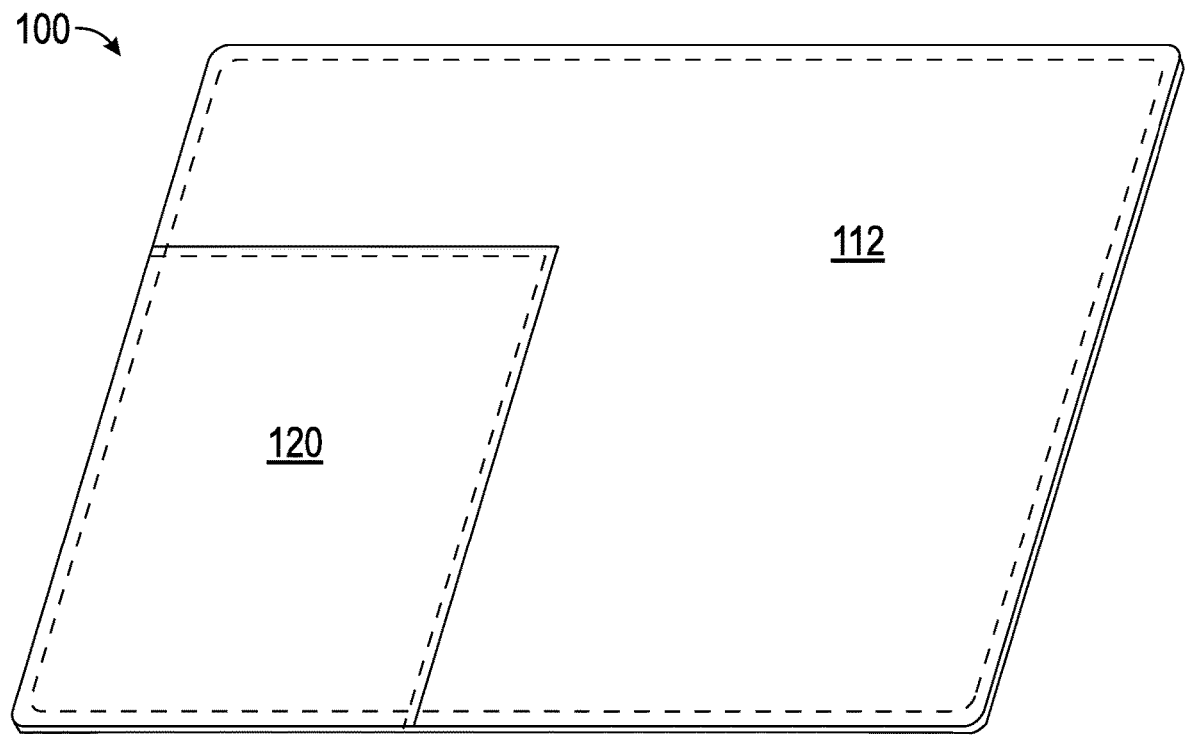
FIG. 12 shows a perspective view of a second embodiment of a portable charger kit in accordance with the present invention, comprising a wallet, a portable power charger stored therein, two removable and interchangeable charging cables and an adapter tip.
Figure 12:
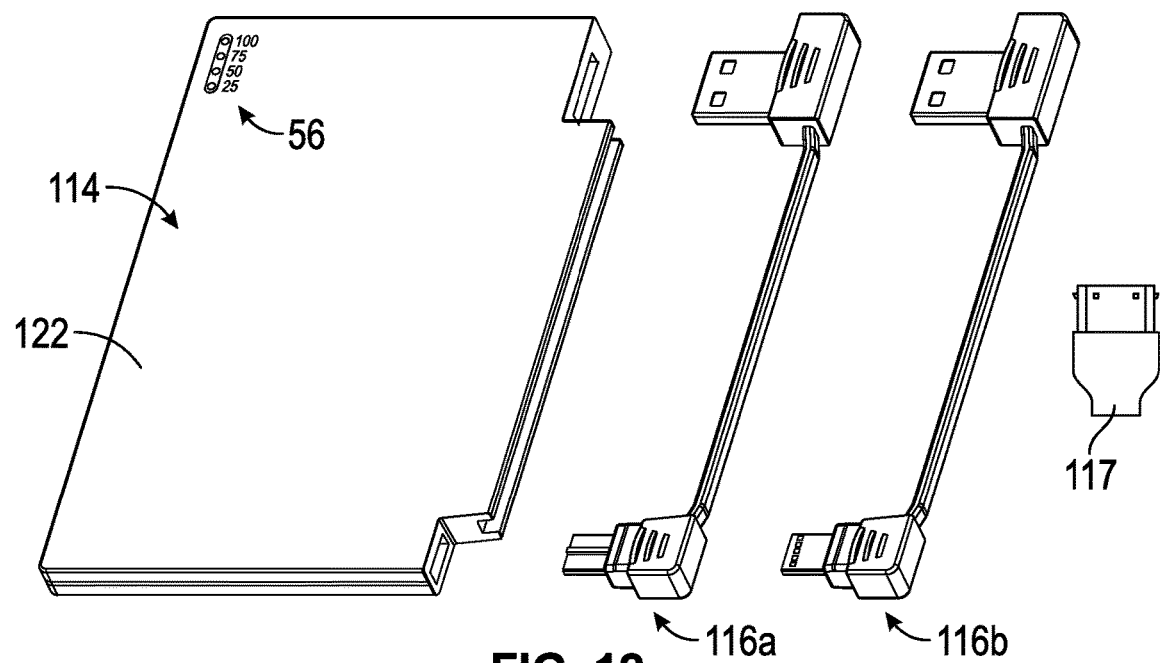

Referring to FIGS. 7-8, the charger housing 22 includes a standard USB female connection port 50 which receives the first end 24 of the removable and replaceable charging cable 16, which is illustrated with a standard USB male connection interface 28. The connection port 50 is included within the first storage cavity 38 such that whenever the first end 24 of the charging cable 16 is stored within the charger housing 22, a connection between the first connection interface 28 and the connection port 50 is maintained. In preferred embodiments, the connection port 50 acts as a power output for supplying a power charge from the internal battery of the charger unit 14 to a portable electronic device via the charging cable 16. As noted above, the second end 30 of the charging cable 16 includes the second connection interface 34 which is designed for connection to the portable electronic device. In operation, the second end 30 of the charging cable 16 can be removed from its storage cavity 40 and flexed out and away from the charger housing 22 for engagement with the connection port of the electronic device in need of a charge. The first end 24 of the charging cable 16 remains in its storage cavity 38 with the first connection interface 28 engaged with the power connection port 50 disposed therein. In this regard, the second connection interface 34 can be any standard interface used for electronic devices, including but not limited to a USB, micro-USB, mini-USB, 30-pin, Apple Lightning, or the like. Indeed, in accordance with the present invention, charging cables can be removed from the charger housing 22 and interchanged, so one cable can use a micro-USB interface, while a replacement uses an Apple Lightning interface, and so on. Indeed, a kit 100 in accordance with the present invention is illustrated in FIG. 12 with two similarly shaped charging cables 116a and 116b adapted to fit into the storage cavities of the charger housing 122 but having different second connection interfaces. With such a kit, a charging cable is always available with the charger and easily transported with the charger as well—preferably within a wallet that can be carried in the user's pocket.

Figure 10:
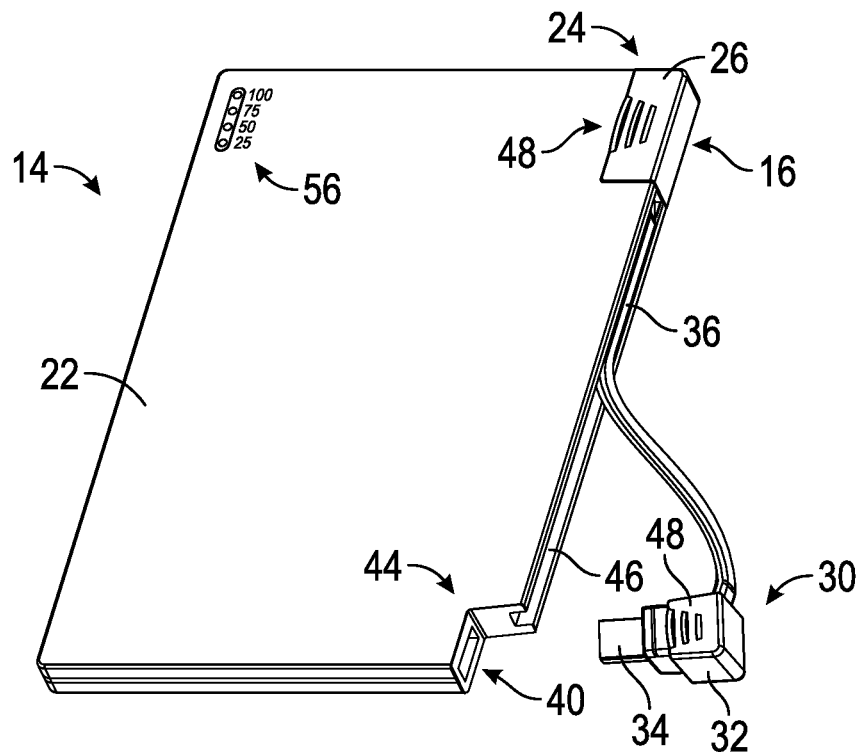
FIG. 10 illustrates a planar front view of a portable charger in accordance with the present invention with the charging cable partially removed for recharging an electronic device connected thereto via an output connection port in accordance with embodiments of the present invention.

In operation, as illustrated in FIG. 10, the second end 30 of the charging cable 16 is flexed away from the charger housing 22 for connection with an electronic device while the first end 24 remains in engagement with the connection port 50. When not in use, the second end 30 is stored within its respective storage cavity 40 in the charger housing 22, preferably designed to maintain the charging cable 16 within a desired footprint for the charger housing 22. A stored charging cable 16 is illustrated in FIGS. 2-3, while a fully removed charging cable 16 is illustrated in FIGS. 5 and 12, which also shows the storage cavities 38, 40 formed within the charger housing 22. As illustrated, the first end 24 of the charging cable 16 is designed to be inserted into and connected with the power connection port 50 even when not in use. In this regard, the charging cable 16 is always available for use. In alternate embodiments, additional charging cables can be added to the charger housing 22—for example, on the opposite side of the housing 22.

In still further embodiments, the charging cables 16 can be secured to the power connection port 50 at the first end 24. Multiple charging cables can be provided on or with the charger housing without departing from the spirit and principles of the present invention.

Figure 6:
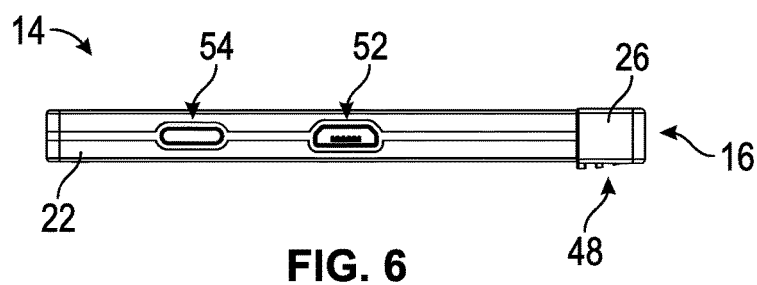
FIG. 6 illustrates a planar top view of the portable power charger of FIG. 3.
Figure 9:
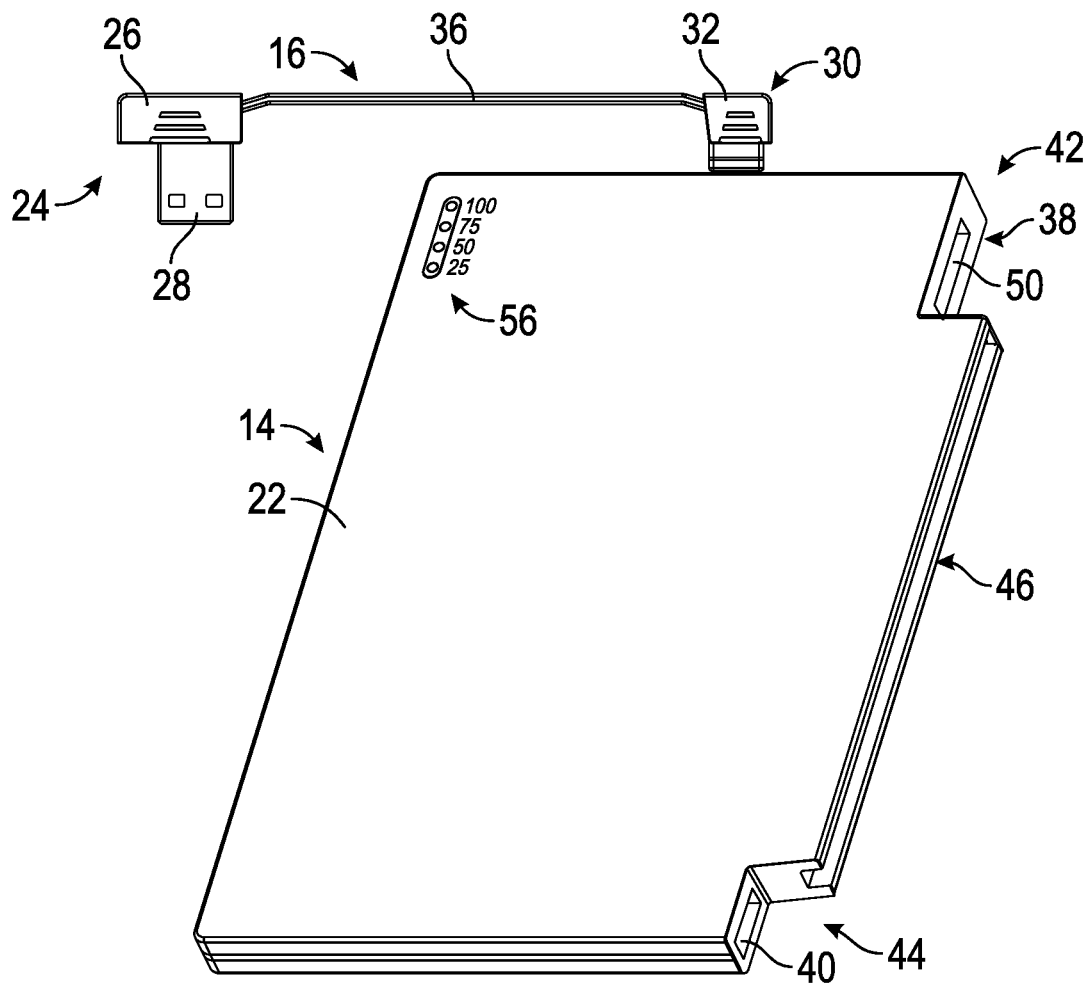
FIG. 9 illustrates a planar front view of the portable power charger of FIG. 3 with the charging cable removed but connected to the charger for recharging the internal battery of the charger via an input connection port in accordance with the first embodiment of the charger.

Similarly, additional power connection ports can be provided on the charger housing 22 without departing from the spirit and principles of the present invention. As illustrated in FIG. 6, an external power connection port 52 is provided on the top face of the charger housing 22. This external connection port 52 is illustrated as a female micro-USB port, but can take the form of any other known connection ports, including USB, mini-USB, 30-pin, Apple Lightning, or the like. This external power connection port 52 can operate as either a power input (for providing an electrical charge from an external power source for recharging the internal battery unit when the charger unit 14 is connected to the external power source) or a power output (for charging the internal batteries of other electronic devices from the rechargeable battery unit), or both. In the illustrated embodiment, the external connection port 52 is intended as a power input port for recharging the internal battery of the charger 14. That is, when the internal battery needs to be recharged, the charger unit 14 is connected to an external power source via the external connection port 52 using a charging cable. Preferably, the charging cable 16 of the charger kit 10 can be fully removed from its storage cavities 38, 40 and 46. The second connection interface 34 of the charging cable 16 is adapted to engage the external connection port 52, as illustrated in FIG. 9, such that the first end 24 is available for connection to an external power source via the first connection interface 28, either directly or using an adapter unit as is known in the art.

In further embodiments of the present invention, charging cables do not need to be included. Instead, connection to the charger unit 14, either for recharging the internal battery unit, or for charging other portable electronic devices, can be accomplished using one or more power connection ports—for example, the external micro-USB port 52 illustrated in FIG. 6. Indeed, the charger unit 14 can utilize a single connection port as both an input and an output, or utilize dedicated connection ports for input and output. In use, a standard charging cable having the appropriate and desirable male connection interfaces can be used to recharge the charger unit 14 and/or charge one or more portable electronic devices.

Other aspects of the power charger illustrated in the figures include a power button (e.g., button 54 shown in FIG. 6) for turning the charger unit on and off—so as to preserve the charge in the internal battery unit when not needed—and a power capacity indicator means 56 (illustrated, for example, in FIGS. 2-3). The indicator means 56 can take any form to indicate the remaining capacity of the internal battery. In the illustrated embodiment, the indicator means 56 shows capacity level in two manners. First, the indicator means 56 comprises a series of lights that correspond to the capacity level. For example, as shown in FIG. 2, there are four lights, each representing 25% capacity. When all four are lit up, the capacity level is "full" (i.e., 76% to 100%); three lights represents 51% to 75%; two lights represents 26% to 50%; and one light represents "empty" or 0% to 25%. Additionally, or alternatively, the color of the lights can change to indicate power capacity—for example, where green lights indicate "full"; yellow lights indicate "half-full"; and red lights indicate "empty."

In one embodiment of the present invention, the first power connection port 50 acts as a power output connection port that supplies a power charge to a portable electronic device via the charging cable 16 when the first end 24 of said cable 16 is connected to the first connection port 50 and the second end 30 of said cable 16 is connected to the electronic device in need of a charge. As illustrated in FIG. 7, the first connection port 50 comprises a standard female USB port that engages the male USB connection interface 28 on the first end 24 of the charging cable 16. When the charging cable 16 is stored within the charger housing 22, the first connection interface 28 maintains a connection to the first connection port 50. In use, the second end 30 of the charging cable 16 can be removed from its storage cavity 40 and flexed out and away from the charger housing 22 for engagement with a portable electronic device, as illustrated in FIG. 10.

In this embodiment, the external power connection port 52, illustrated as a female micro-USB port, is provided on the charger housing 22 for recharging the internal battery of the charger unit 14 when a charging cable (preferably the removed charging cable 16) is connected between the external connection port 52 and an external power source. In this regard, the external connection port 52 acts as a power input connection.

In this embodiment, the present invention also envisions use of removable and interchangeable charging cables, such as illustrated in FIG. 12, where a first charging cable 116a provides one type of connection interface on the second end 130 of the cable (e.g., a male micro-USB interface 134a) and a second charging cable 116b provides a different type of connection interface on the second end 130 of the cable (e.g., an Apple Lightning interface 134b). Additional charging cables can use additional connection interfaces. Still further, adapter tips (such as 30-pin adapter tip 117 shown in FIG. 12) can be provided to expand functionality of the charger kit 100, whereby the adapter tip 117 can be attached to the second end connection interface 134 for use with a particular electronic device. Preferably, the second cavity is designed to receive and accommodate a variety of connection interfaces for storage without affecting the size and shape of the charger housing 122, thereby permitting the interchanging of connecting cables without detracting from the operation and aesthetics of the charger kit 100.

In another embodiment of the present invention, the first power connection port 50 acts as both a power output connection and a power input connection. In this regard, the USB connection port 50 can comprise a two-way charging interface, such as described and illustrated in co-pending U.S. application Ser. No. 13/682,985, filed Nov. 21, 2012, which shares common inventors with the present application and which is incorporated herein by reference. Thus, the first connection interface 28 of the charging cable 16 can remain in engagement with the power connection port 50 and the second end 30 of said cable 16 flexed out and away from the charger housing 22 for engagement with an external power source for recharging the internal battery of the charger 14 (i.e., power input connection) or for engagement with an electronic device for charging from the internal battery (i.e., power output connection).

Figure 11:
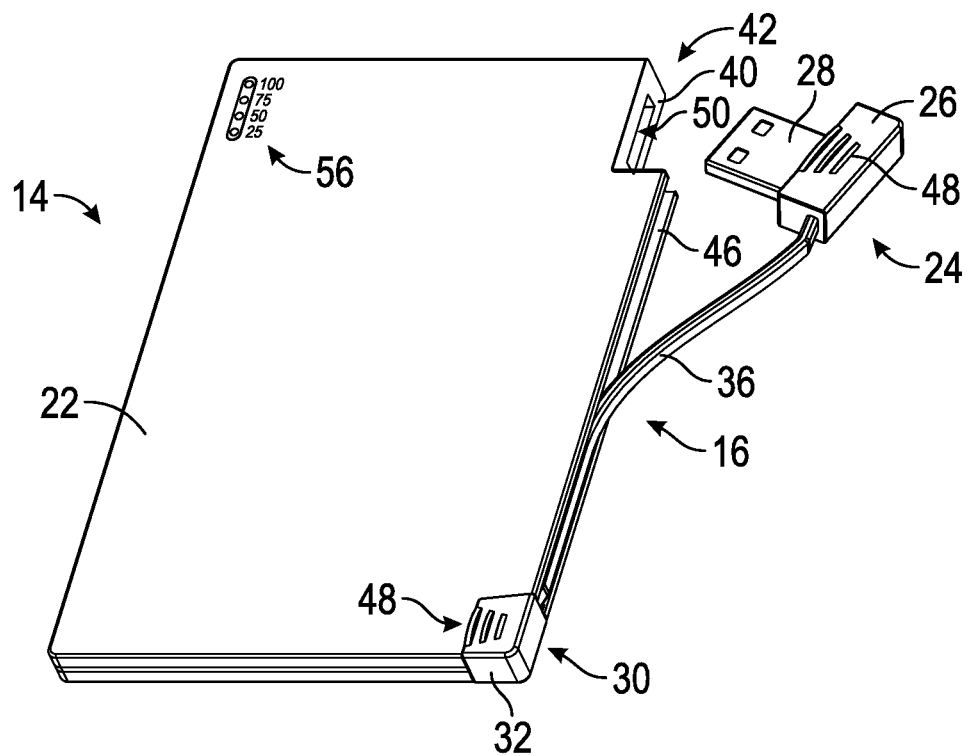
FIG. 11 illustrates a planar front view of the portable power charger of FIG. 8 with the charging cable partially removed for recharging the internal battery of the charger via an input connection port in accordance with the second embodiment of the charger.

In yet another embodiment of the present invention, the first power connection port 50 acts as a power output connection port that supplies a power charge to a portable electronic device via the charging cable 16 when the first end 24 of said cable 16 is connected to the first connection port 50 and the second end 30 of said cable 16 is connected to the electronic device in need of a charge. The charger 14 can include a second internal power connection port 58 disposed within the second cavity 40 that acts as a power input connection port that receives a power charge from an external power source via the charging cable 16 when the second end 30 of said cable 16 is connected to the second connection port 58 and the first end 24 of said cable 16 is connected to the external power source. As illustrated in FIG. 8, the first connection port 50 comprises a standard female USB port that engages the male USB connection interface 28 on the first end 24 of the charging cable 16, and the second connection port 58 comprises a female micro-USB port that engages the male micro-USB connection interface 34 on the second end 30 of the charging cable 16. When the charging cable 16 is stored within the charger housing 22, the first connection interface 28 maintains a connection to the first connection port 50 and the second connection interface 34 maintains a connection to the second connection port 58. In use, the second end 30 of the charging cable 16 can be removed from its storage cavity 40 and flexed out and away from the charger housing 22 for engagement with a portable electronic device, as illustrated in FIG. 10. Similarly, the first end 24 of the charging cable 16 can be removed from its storage cavity 38 and flexed out and away from the charger housing 22 for engagement with an external power source, as illustrated in FIG. 11.

In still another embodiment, the second cavity 40 includes the second internal connection port 58, where said port 58 is adjustable or specifically designed to accommodate and engage different connection interfaces, thereby permitting different interchangeable charging cables with different connection interfaces to be used with the charger 14. As so designed, when charging cables are removed and interchanged, the charger 14 can be used for input connectivity and output connectivity regardless of which charging cable is in place in the charger housing 22.

In preferred embodiments of the present invention, the rechargeable battery unit is disposed within the charger housing 22. The rechargeable battery unit is operatively connected with the power connection port(s), be they input ports (e.g., external connection port 52 or second internal connection port 58) provided in the charger housing 22 for recharging the battery when the charger 14 is connected to an external power source, or power output ports (e.g., first internal connection port 50) for recharging electronic devices connected to the power charger 14 from the rechargeable battery unit. In preferred embodiments, the battery unit comprises a rechargeable Lithium-Ion battery. For example, one embodiment of the portable charger unit comprises a single Lithium Polymer battery can be provided to supply 3,000 mAh.

The power charger 14 also includes various electrical components (such as integrated circuit chips and other circuitry) to provide computing operations for the device. The integrated circuitry and other components may comprise a power supply (e.g., the internal rechargeable battery), a microprocessor and controller (e.g., a CPU), memory (e.g., ROM, RAM, flash), a circuit board, a hard drive, and/or various input/output (I/O) support circuitry. The electrical components may also include components for sending and receiving data and media (e.g., antenna, receiver, transmitter, transceiver, etc.).

The power charger 14 also comprises a controller, including a processing unit, configured to execute instructions and to carry out operations associated with the power charger. For example, the processing unit can keep track of the capacity level of the battery unit, store data or provide a conduit means by which data can be exchanged between electronic devices, such as between a smart phone and a computer. The processing unit communicates with the battery unit to determine how much capacity is remaining in the battery. Upon determining the capacity level, the processing unit can communicate with a power indicator means 56 to provide the user with information for how much capacity is remaining in the internal rechargeable battery unit and whether the charger 14 needs to be connected to an external power source for recharging.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A portable power charger kit comprising:
   a wallet; and
   a portable power charger unit for recharging an electronic device having a rechargeable internal battery, said portable charger unit comprising:
   a charger housing internally storing a rechargeable battery unit and sized to fit into the wallet;
   a first power connection port that operates as a power output for charging the rechargeable internal battery of said electronic device from the rechargeable battery unit of the charger unit, said first power connection port being operatively connected to the rechargeable battery unit of the charger unit;
   a second power connection port in operative communication with the rechargeable battery unit of the charger unit that operates as a power input for providing an electrical charge from an external power source for recharging the rechargeable battery unit when the charger unit is connected to said external power source; and
   a removable charging cable storable within the general volume of the charger housing, said charging cable having a first end with a first head and a first connection interface projecting therefrom, a second end with a second head and a second connection interface projecting therefrom, and an intermediate flexible cable portion connecting the two ends;
   wherein the charger housing includes a first cavity adapted to receive the first end of the charging cable and a second cavity adapted to receive the second end of the charging cable such that the first and second connection interfaces are disposed within the charger housing,
   wherein at least one of the power connection ports is disposed within one of the first and second cavities for engagement with one of the first and second connection interfaces when the charging cable is stored in said cavity of the charger housing whereby a power charge can be exchanged between the rechargeable battery unit of the charger unit and the power connection port disposed within said cavity.

2. The portable power charger kit according to claim 1, wherein the other of the power connection ports is disposed on the exterior surface of the charger housing whereby a power charge can be exchanged between the rechargeable battery unit of the charger unit and the power connection port disposed on the charger housing.

3. The portable power charger kit according to claim 2, wherein the first power connection port is disposed within the first cavity and engages the first connection interface when the first end of said charging cable is stored in the first cavity of the charger housing, whereby a power charge can be supplied from the rechargeable battery unit of the charger unit to an electronic device connected to the second connection interface of the second end of the charging cable via the first end's connection to the first power connection port; and
   wherein the second power connection port is exposed through the exterior surface of the charger housing whereby a power charge can be provided to the rechargeable battery unit of the charger unit from an external power source when the charger unit is connected to said external power source via the second power connection port.

4. The portable power charger kit according to claim 3, wherein the second end of the charging cable can be removed from its storage cavity and flexed out and away from the charger housing for engagement with the electronic device in need of a charge while the first end of the charging cable remains connected to the first power connection port.

5. The portable power charger kit according to claim 2, wherein the second power connection port is disposed within the second cavity and engages the second connection interface when the second end of said charging cable is stored in the second cavity of the charger housing, whereby a power charge can be supplied to the rechargeable battery unit of the charger unit from an external power source connected to the first connection interface of the first end of the charging cable via the second end's connection to the second power connection port; and wherein the first power connection port is exposed through the exterior surface of the charger housing whereby a power charge can be provided from the rechargeable battery unit of the charger unit to an electronic device when the charger unit is connected to said electronic device via the first power connection port.

6. The portable power charger kit according to claim 5, wherein the first end of the charging cable can be removed from its storage cavity and flexed out and away from the charger housing for engagement with the external power source while the second end of the charging cable remains connected to the second power connection port.

7. The portable power charger kit according to claim 1, wherein at least one of the power connection ports is disposed on the exterior surface of the charger housing whereby a power charge can be exchanged between the rechargeable battery unit of the charger unit and the power connection port disposed on the charger housing.

8. The portable power charger kit according to claim 7, wherein the charging cable can be removed from its storage position in the charger housing to be used to connect to the at least one power connection port disposed on the exterior surface of the charger housing.

9. The portable power charger kit according to claim 1, further comprising a channel cavity that is provided in the charger housing for receiving the intermediate cable portion for storage of the charging cable in a non-use condition.

10. The portable power charger kit according to claim 9, further comprising friction grips on each of the first and second heads for facilitating removal of said heads from their respective storage cavities in the charger housing.

11. A portable power charger kit comprising:
a wallet; and
a portable power charger unit for recharging an electronic device having a rechargeable internal battery, said portable charger unit comprising:
a charger housing internally storing a rechargeable battery unit and sized to fit into the wallet;
a first power connection port that operates as a power output for charging the rechargeable internal battery of said electronic device from the rechargeable battery unit of the charger unit, said first power connection port being operatively connected to the rechargeable battery unit of the charger unit;
a second power connection port in operative communication with the rechargeable battery unit of the charger unit that operates as a power input for providing an electrical charge from an external power source for recharging the rechargeable battery unit when the charger unit is connected to said external power source; and
a removable charging cable storable within the general volume of the charger housing, said charging cable having a first end with a first head and a first connection interface projecting therefrom, a second end with a second head and a second connection interface projecting therefrom, and an intermediate flexible cable portion connecting the two ends;
wherein the charger housing includes a first cavity adapted to receive the first end of the charging cable and a second cavity adapted to receive the second end of the charging cable such that the first and second connection interfaces are disposed within the charger housing,
wherein the wallet includes an RFID protection layer.

12. A portable power charger kit comprising:
a wallet;
a portable power charger unit for recharging at least one electronic device having a rechargeable internal battery, said portable charger unit comprising:
a charger housing internally storing a rechargeable battery unit and sized to fit into the wallet;
a power connection port operatively connected to the rechargeable battery unit; and
multiple interchangeable charging cables whereby one of said cables is stored in the charger housing at a time, but may be removed and replaced by a different one of said cables, each cable having a first end with a first head and a first connection interface projecting therefrom, a second end with a second head and a second connection interface projecting therefrom, and an intermediate flexible cable portion connecting the two ends,
wherein the charger housing includes a first cavity adapted to receive the first end of each charging cable and a second cavity adapted to receive the second end of each charging cable such that at least the first and second connection interfaces for each charging cable can be disposed within the general volume of the charger housing when one of said cables is stored in the charger housing,
wherein said power connection port is disposed within the first cavity and engages the first connection interface when the first end of one of the charging cables is stored in the first cavity of the charger housing, and
wherein the second end of the charging cable stored with the charger housing can be removed from the second storage cavity and flexed out and away from the charger housing for engagement with the electronic device in need of a charge while the first end of the charging cable remains connected to the power connection port.

13. The portable power charger kit according to claim 12, further comprising a second power connection port operatively connected with the rechargeable battery unit and disposed in the second cavity that engages the second connection interface when the second end of one of the charging cables is stored in the second cavity of the charger housing, and
wherein the first end of the charging cable stored within the charger housing can be removed from the first storage cavity and flexed out and away from the charger housing for engagement with one of the electronic device in need of a charge or an external power source while the second end of the charging cable remains connected to the second power connection port.

14. The portable power charger kit according to claim 12, further comprising a second power connection port disposed on the exterior surface of the charger housing whereby a power charge can be exchanged between the rechargeable battery unit of the charger unit and the second power connection port.

15. The portable power charger kit according to claim 14, wherein the charging cable stored within the charger housing can be removed from its storage position in the charger housing to be used to connect to the power connection port disposed on the exterior surface of the charger housing.

16. The portable power charger kit according to claim 12, further comprising a channel cavity that is provided in the charger housing for receiving the intermediate cable portion of each of said cables for storage of one of the charging cables in a non-use condition.

17. The portable power charger kit according to claim 16, further comprising friction grips on each of the first and second heads of the charging cables for facilitating removal of said heads from their respective storage cavities.

18. A portable power charger kit comprising:
a wallet;
a portable power charger unit for recharging at least one electronic device having a rechargeable internal battery, said portable charger unit comprising:
a charger housing internally storing a rechargeable battery unit and sized to fit into the wallet;
a power connection port operatively connected to the rechargeable battery unit;
multiple interchangeable charging cables whereby one of said cables is stored in the charger housing at a time, but may be removed and replaced by a different one of said cables, each cable having a first end with a first head and a first connection interface projecting therefrom, a second end with a second head and a second connection interface projecting therefrom, and an intermediate flexible cable portion connecting the two ends, wherein the charger housing includes a first cavity adapted to receive the first end of each charging cable and a second cavity adapted to receive the second end of each charging cable such that at least the first and second connection interfaces for each charging cable can be disposed within the general volume of the charger housing when one of said cables is stored in the charger housing; and
at least one adapter tip having a female connection port adapted to engage a connection interface of one of said interchangeable charging cables.

19. A portable power charger kit comprising:
a wallet;
a portable power charger unit for recharging at least one electronic device having a rechargeable internal battery, said portable charger unit comprising:
a charger housing internally storing a rechargeable battery unit and sized to fit into the wallet;
a power connection port operatively connected to the rechargeable battery unit; and
multiple interchangeable charging cables whereby one of said cables is stored in the charger housing at a time, but may be removed and replaced by a different one of said cables, each cable having a first end with a first head and a first connection interface projecting therefrom, a second end with a second head and a second connection interface projecting therefrom, and an intermediate flexible cable portion connecting the two ends, wherein the charger housing includes a first cavity adapted to receive the first end of each charging cable and a second cavity adapted to receive the second end of each charging cable such that at least the first and second connection interfaces for each charging cable can be disposed within the general volume of the charger housing when one of said cables is stored in the charger housing,
wherein the wallet includes an RFID protection layer.

* * * * *